United States Patent Office 3,171,123
Patented Feb. 23, 1965

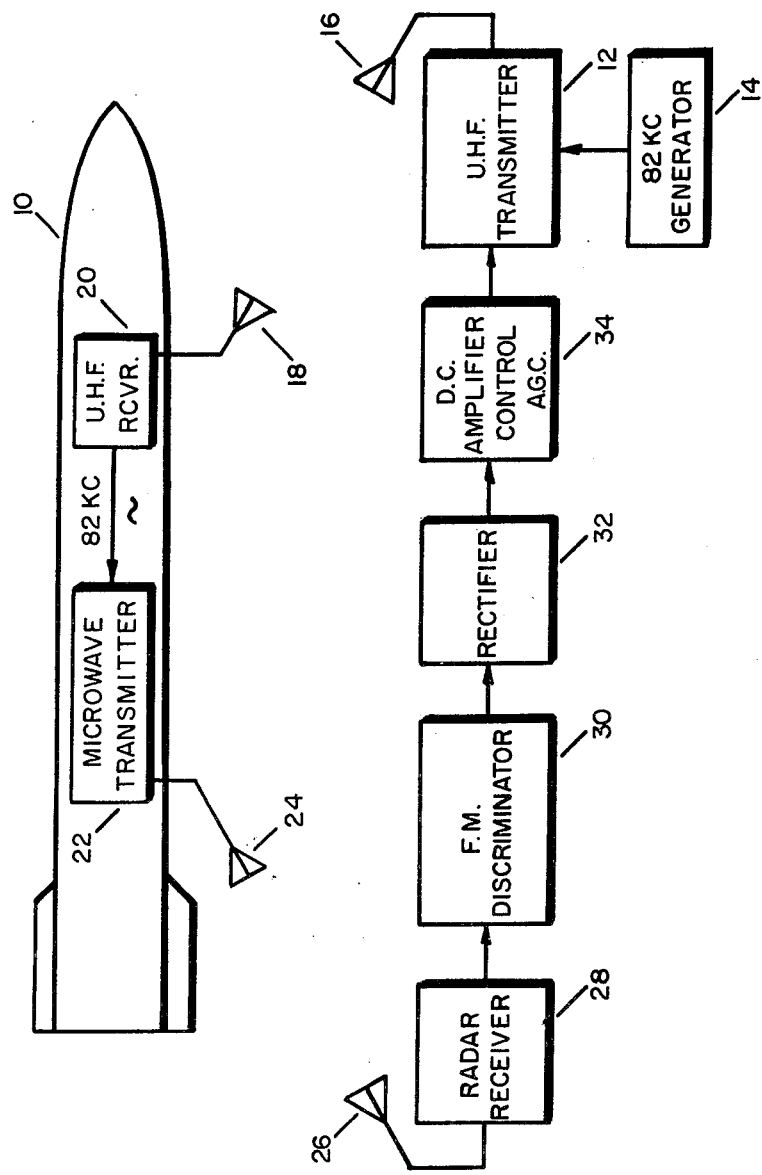

3,171,123
RADIO BEACON SYSTEM
Joel S. Spira, New York, N.Y., assignor to Maxson Electronics Corporation, a corporation of New York
Filed Oct. 28, 1959, Ser. No. 849,385
7 Claims. (Cl. 343—6.8)

The present invention relates to a radar beacon system and particularly to a system including an airborne beacon.

In radar or other systems including a beacon or transpondor the carrier wave power supplied to the beacon receiver may vary over wide limits and produce malfunctioning. This is particularly true with respect to airborne beacons adapted to be carried by small missiles. It is accordingly an object of the invention to supply a signal to the receiver of such a beacon which is always constant. Such a constant amplitude signal will cause no phase distortion in the range information and thereby provide greater range accuracy.

Another object of the invention is to supply to the airborne receiver just enough power to make it transpond so that there is no excess of signal, and consequently spurious signals occurring from reflections or antenna side lobes are reduced.

Another object of the invention is to reduce the variations in signal level due to the airborne antenna pattern and to counteract such variations of signal level much faster and more effectively than has heretofore been possible.

Still another object of the invention is to provide a radar beacon system in which the airborne beacon is very simple in construction.

According to the invention, a signal is sent up from a transmitter on the ground on a microwave or ultra high frequency carrier wave, the modulation being either a sine wave or a pulse. Range information is derived from the sine or pulse modulation. In the case of the sine wave, it is sent up to the beacon and back down; its phase is then compared to the precision sine wave oscillator which generated it, and range information is thereby derived. In the case of pulse modulation, as with normal radar techniques, the time of flight of the pulse is measured, and the range is thereby derived. The carrier for this modulation is received at the airborne beacon. The range modulation, i.e. either a sine wave or a pulse, is detected at the beacon receiver. In the beacon, the modulation then is applied to a continuously oscillating transmitter tube. The range modulation modulates the frequency of the transmitter tube.

The transmitted radio frequency signal with the frequency modulation on it is sent down to a receiver on the ground and detected. Automatic gain control action is provided as follows: The stronger the signal that is received at the airborne beacon the larger will be the amplitude of the modulation applied to the transmitting tube. Therefore, the frequency deviation of the transmitted signal will be larger. This signal is received by the receiver down on the ground and detected by an F.M. discriminator, and in any such F.M. discriminator the larger the frequency deviation the greater will be the voltage out of the discriminator. Hence the larger the signal received at the airborne beacon, the larger will be the modulation applied to the beacon transmitter, the larger will be the frequency deviation on the return signal, and the larger will be the amplitude of the detected voltage out of the frequency discriminator in the ground receiver. This voltage may be rectified and smoothed so as to give a signal which may be applied to the ground transmitter to cut down the transmitted power from the ground transmitter to the airborne receiver.

The radio frequency signal may be variably attenuated in suitable manner, as by a voltage applied to the ground transmitting tubes or by various ferrite attenuators. Both techniques are in common practice. The character of the modulation, whether pulse or C.W., provides no difficulty. All that is required is an arrangement of circuit constants so that a signal may be processed to provide a direct current to change the radio frequency power.

The invention will be fully understood and other objects and advantages thereof will become apparent from the following description and the drawing in which the figure shows a block diagram of the radar beacon system according to the invention.

It will be assumed in the following description of the invention that the system includes an airborne radio beacon mounted in a missile or aircraft 10 communicating with a ground station. The ground station includes a transmitter 12 operating at a carrier frequency high enough to be uninfluenced by ionospheric conditions. The carrier frequency may be in the U.H.F. range or a microwave carrier. The transmitter 12 is modulated by a constant frequency generator 14. Generator 14 may have a frequency corresponding to 82 kilocycles so that each cycle represents one mile of back and forth travel of a radio wave. The modulation of transmitter 12 may be pulse modulation or sine wave modulation. The 82 kc. amplitude modulated carrier wave is supplied to an antenna 16 for transmission to the beacon receiving antenna 18. The beacon receiver 20 therefore produces an 82 kc. output voltage which is proportional to the strength of the signal received by antenna 18 and supplies this signal to a microwave transmitter 22. Transmitter 22 is a frequency modulated transmitter so that it produces an output carrier wave whose frequency is modulated at an 82 kc. rate with a frequency deviation proportional to the amplitude of the 82 kc. signal. The frequency modulated microwave signal from transmitter 22 is radiated by an antenna 24 to an antenna 26. This received signal is supplied to a radar receiver 28 which may be of the superheterodyne type and includes an F.M. discriminator 30. The output of the F.M. discriminator is an 82 kc. signal having an amplitude varying in accordance with the strength of the signal received by antenna 18. This signal is supplied through a suitable rectifier 32, which may include smoothing circuits, for providing a direct current voltage proportional to the frequency deviation of the frequency modulation to a D.C. amplifier and automatic gain control circuit 34. The control voltage is supplied to any suitable means such as the transmitting tubes or ferrite attenuators in the transmitter for controlling the amplitude of the output carrier wave proportionally to the frequency deviation. It is seen that the automatic gain control loop has an 82 kc. sampling rate, which is extremely high. This more than allows for control of the fastest variation that would occur in the radio frequency loop between the airborne beacon and the ground station. It will be evident that by virtue of this automatic gain control system the strength of the carrier wave supplied to antenna 18 is maintained very constant.

An important feature of this system is that it requires no automatic gain control circuitry in the airborne beacon and yet provides a superior automatic gain control performance. This results in greater range accuracy both from pulse and sine wave range information. The chief deterrent to range accuracy in a beacon system of the kind described is the variation of the signal level. The variation of the signal level ordinarily causes triggering on various parts of the rise front of the received pulses or introduces phase distortion when a continuous wave signal is used, and in both cases adversely effect the range accuracy. This fault is obviated in the present system because the range signal has a constant amplitude through both the radio frequency links and the internal circuitry of the airborne beacon and the ground equipment.

Another problem occurring at the launching of a missile is that due to the proximity of the radar to the beacon, the beacon responds no matter which way the radar antenna is turned, because of the very strong signals. Therefore, radar tracking becomes confused. The system of the present invention automatically cuts down transmitter power to the proper level so that tracking may become unambiguous. Since the automatic gain control system herein disclosed can quickly act to keep a constant signal level throughout the radio frequency system, better tracking performance is obtained. Other applications, variations and modifications of the invention will be apparent to those skilled in the art. Accordingly, the invention is not to be construed as limited except as defined in the following claims.

What is claimed is:

1. A radar beacon system comprising a first transmitter including means for generating a carrier wave, means for amplitude modulating the carrier wave of said first transmitter with a signal of constant frequency, a remote beacon including a radio receiver for receiving said carrier wave and having a detector for extracting the modulation signal therefrom, a second transmitter connected to said remote receiver and including means for generating a carrier wave and means for frequency modulating said carrier wave in accordance with the amplitude of the output signal of said remote receiver, means for radiating the output of said second transmitter, a frequency modulation receiver for receiving the frequency modulated carrier wave from said second transmitter and means responsive to the output of said frequency modulation receiver for controlling the first mentioned transmitter to vary the amplitude of the carrier wave output thereof in accordance with the frequency deviation of the received frequency modulated carrier wave.

2. A radar beacon system comprising a first continuous wave transmitter including means for generating a first carrier wave, means for amplitude modulating the carrier wave of said transmitter with a sinusoidal signal of a constant frequency, a remote beacon including a radio receiver for receiving said carrier wave and having a detector for extracting the modulation signal therefrom, a second transmitter connected to said remote receiver and including means for generating a second carrier wave and means for frequency modulating said second carrier wave in accordance with the amplitude of said signal, extracted by said detector, means for radiating the output of said second transmitter, a frequency modulation receiver for receiving the frequency modulated carrier wave and for detecting the frequency modulated signal therefrom, and means responsive to the output of said frequency modulation receiver for controlling the first transmitter to vary the amplitude of the carrier wave output thereof in accordance with the frequency deviation of the signal on the received frequency modulated carrier wave.

3. A radar beacon system comprising a first carrier wave transmitter including means for generating a carrier wave, a remote beacon including a radio receiver for receiving the carrier wave radiated from said first transmitter, a second transmitter connected to said remote receiver and including means for generating a carrier wave together with means for frequency modulating said second carrier wave in accordance with the amplitude of the carrier wave received by said receiver, means for radiating the output of said second transmitter, a frequency modulation receiver for receiving the frequency modulated carrier wave and for detecting the modulation signal therefrom, and means responsive to the output of said frequency modulation receiver for controlling the first transmitter to vary the amplitude of the carrier wave output thereof in accordance with the frequency deviation of the received frequency modulated carrier wave.

4. A radar beacon system comprising a first ground based carrier wave transmitter including means for generating a carrier wave, means including a constant frequency oscillator for modulating the amplitude of the carrier wave of said transmitter, an airborne beacon including an amplitude modulation radio receiver for receiving said carrier wave and for detecting the modulation signal therefrom, a second transmitter, means connected to said receiver for frequency modulating said second transmitter in accordaance with the amplitude of the output signal from said receiver, means for radiating the output of said second transmitter, a ground based receiver for receiving the frequency modulated carrier wave and for detecting the frequency modulating signal therefrom and means responsive to the output of said receiver for controlling the first mentioned transmitter to vary the amplitude of the carrier wave output thereof in accordance with the frequency deviation of the received frequency modulated carrier wave.

5. In combination, a local radio transmitter and receiver combination, and a remote radio receiver transmitter combination, the local transmitter, including means to generate an outgoing carrier wave of preselected fixed frequency and means to modulate said carrier by an amplitude signal of fixed frequency and means for radiating the outgoing carrier wave thus modulated; the remote receiver being tuned to receive said amplitude modulated carrier wave and having means for detecting the modulating signal therefrom; and the remote transmitter including means to generate a return carrier wave; means responsive to said detected signal from the associated remote receiver for frequency modulating said return carrier wave, and means for radiating such frequency modulated return carrier wave; said local receiver being tuned to receive said return carrier wave and to detect the frequency-modulation signal therefrom; and means responsive to said frequency modulation signal from the local receiver for controlling the amplitude of the outgoing carrier wave from the local transmitter.

6. A radar beacon system comprising a radio transmitter-receiver combination including means to control the intensity of the transmitter radiation, a remote beacon including a beacon receiver for receiving the radiation of said radio transmitter, and a beacon transmitter for transmitting signals containing information indicative of the strength of said radio transmitter radiation at said beacon receiver, the control means of said transmitter-receiver combination being responsive to the signals from the beacon transmitter for maintaining the radiation received by said beacon receiver at a constant level.

7. In combination, a first radio transmitter, means for controlling the output of said transmitter, first radio receiver means located at a distance from said first transmitter means, second transmitter means located in proximity to said first receiver means for transmitting signals containing information dependent upon the strength of the signal received by said first receiver means, and a second receiver located in proximity to said first transmitter, said second receiver including means responsive to said information operatively connected to said means for controlling.

References Cited in the file of this patent

UNITED STATES PATENTS

| 2,530,418 | Alvarez | Nov. 21, 1950 |
| 2,923,935 | Sinclair et al. | Feb. 2, 1960 |
| 2,981,943 | Dodington | Apr. 25, 1961 |

FOREIGN PATENTS

| 1,121,949 | France | May 14, 1956 |